US007464138B2

(12) United States Patent
Le et al.

(10) Patent No.: US 7,464,138 B2
(45) Date of Patent: Dec. 9, 2008

(54) MIRROR QUEUE IN A SHARED QUEUE ENVIRONMENT

(75) Inventors: Cuong Minh Le, Tucson, AZ (US); Glenn Randle Wilcock, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 864 days.

(21) Appl. No.: 10/112,186

(22) Filed: Mar. 29, 2002

(65) Prior Publication Data

US 2004/0225721 A1  Nov. 11, 2004

(51) Int. Cl.
  G06F 12/00 (2006.01)
  G06F 13/00 (2006.01)
  G06F 13/28 (2006.01)
  G06F 15/16 (2006.01)
  G06F 15/167 (2006.01)

(52) U.S. Cl. ............... 709/206; 709/201; 709/202; 709/203; 709/213; 709/214; 711/147

(58) Field of Classification Search ............... 711/100, 711/147; 709/201–205, 213–214; 707/200–204
  See application file for complete search history.

(56) References Cited

U.S. PATENT DOCUMENTS

| 4,807,111 A | * | 2/1989 | Cohen et al. ............... 710/54 |
| 5,349,656 A | * | 9/1994 | Kaneko et al. ............. 718/102 |
| 5,442,785 A | * | 8/1995 | Roffe et al. ................... 707/8 |
| 5,555,396 A | | 9/1996 | Alferness et al. |
| 5,588,132 A | | 12/1996 | Cardoza |
| 5,706,512 A | | 1/1998 | Bahls et al. |
| 5,745,778 A | | 4/1998 | Alfieri |

(Continued)

OTHER PUBLICATIONS

"Queue Analysis of ATM Multicast Switching Models", IEEE Transactions on Communications, vol. 43, No. 12, (Dec. 1995), Xing Chen, I. Lambadaris and Jeremiah F. Hayes, pp. 2886-2890.

(Continued)

*Primary Examiner*—Bunjob Jaroenchonwanit
*Assistant Examiner*—Angela Widhalm
(74) *Attorney, Agent, or Firm*—Scully, Scott, Murphy & Presser, P.C.

(57) ABSTRACT

Disclosed are a queue management system and a method of managing a queue. This system and method are for use with a parallel processing system including a plurality of clients and a plurality of processors. The clients receive messages and transmit the messages to a shared queue for storage, and the processors retrieve messages from the shared queue and process said messages. The queue management system includes a mirror queue for maintaining a copy of each message transmitted to the shared queue by one of the clients; and the queue management system stores to the mirror queue, a copy of each message transmitted to the shared queue by that one of the clients. The mirror queue provides the system with continuity in case of an outage of the shared queue. In the event of such an outage, each instance of an application can simply discontinue using the shared queue and process requests from the mirror queue. The mirror queue is used until the shared queue is once again available. Preferably, the copy of each message transmitted to the mirror queue is provided with a reference, such as a poiner, to the location of the message on the shared queue.

14 Claims, 2 Drawing Sheets

U.S. PATENT DOCUMENTS

| | | | |
|---|---|---|---|
| 5,797,005 A * | 8/1998 | Bahls et al. | 719/314 |
| 5,844,980 A * | 12/1998 | Patel et al. | 379/88.22 |
| 5,870,746 A * | 2/1999 | Knutson et al. | 707/101 |
| 5,999,910 A * | 12/1999 | Rosenfeld et al. | 705/7 |
| 5,999,930 A * | 12/1999 | Wolff | 707/8 |
| 6,006,307 A | 12/1999 | Cherukuri | |
| 6,035,412 A * | 3/2000 | Tamer et al. | 714/6 |
| 6,058,378 A * | 5/2000 | Clark et al. | 705/37 |
| 6,073,109 A * | 6/2000 | Flores et al. | 705/8 |
| 6,125,399 A * | 9/2000 | Hamilton | 709/245 |
| 6,182,197 B1 * | 1/2001 | Dias et al. | 711/151 |
| 6,195,685 B1 | 2/2001 | Mukherjee et al. | |
| 6,195,695 B1 * | 2/2001 | Cheston et al. | 709/221 |
| 6,212,543 B1 * | 4/2001 | Futral | 718/102 |
| 6,247,055 B1 * | 6/2001 | Cotner et al. | 709/227 |
| 6,304,913 B1 * | 10/2001 | Rune | 709/241 |
| 6,310,889 B1 * | 10/2001 | Parsons et al. | 370/466 |
| 6,327,579 B1 * | 12/2001 | Crawford | 705/400 |
| 6,388,687 B1 * | 5/2002 | Brackett et al. | 715/810 |
| 6,606,163 B1 * | 8/2003 | Suzuki et al. | 358/1.15 |
| 6,665,814 B2 * | 12/2003 | Hobson et al. | 714/16 |
| 6,721,778 B1 * | 4/2004 | Smith et al. | 718/103 |
| 6,769,027 B1 * | 7/2004 | Gebhardt et al. | 709/228 |
| 6,782,416 B2 * | 8/2004 | Cochran et al. | 709/208 |
| 6,795,902 B2 * | 9/2004 | Frick | 711/153 |
| 6,810,411 B1 * | 10/2004 | Coughlin et al. | 709/203 |
| 6,917,941 B2 * | 7/2005 | Wight et al. | 707/10 |
| 7,076,736 B2 * | 7/2006 | Hugh | 715/743 |
| 7,093,004 B2 * | 8/2006 | Bernardin et al. | 709/219 |
| 7,310,803 B2 * | 12/2007 | Haughey | 718/107 |
| 7,337,472 B2 * | 2/2008 | Olsen et al. | 726/26 |
| 7,376,693 B2 * | 5/2008 | Neiman et al. | 709/201 |
| 2001/0051955 A1 * | 12/2001 | Wong | 707/201 |
| 2002/0138558 A1 * | 9/2002 | Ferlitsch | 709/203 |
| 2002/0165898 A1 * | 11/2002 | Duffy et al. | 709/102 |
| 2004/0054770 A1 * | 3/2004 | Touboul | 709/223 |
| 2004/0139125 A1 * | 7/2004 | Strassburg et al. | 707/202 |

OTHER PUBLICATIONS

"Design of a Nonblocking Shared-Memory Copy Network for ATM" Ronald P. Bianchini Jr., and Hyong S. Kim, IEEE (1992), Department of Electrical and Computer Engineering, pp. 0876-0885.

"Use of a Mirror Queue for the Collection of Accurate Status Information", Research Disclosure, (Dec. 1998).

* cited by examiner

MIRROR QUEUE IN A SHARED QUEUE ENVIRONMENT

BACKGROUND OF THE INVENTION

1. Technical Field

The present invention relates generally to parallel processing environments, and more specifically to a shared queue for a multi-processor environment.

2. Background Art

It is commonplace in contemporary data processing environments to provide a plurality of systems to handle the processing needs of one or more clients. For example, two or more systems, such as transaction processing systems, may be interfaced to one or more clients via a communications network. In this environment, when a client has a task to be performed by one of the systems, that client sends an input message to the desired system to request processing by an application running in that system. The subject system queues the message and provides the message to the application for processing. When processing is complete, the application places an outgoing message in the queue for transmission over the network to the client.

To take advantage of the multi-processing aspect of this environment, the system originally tasked by the client, system A, may extract the input message from its queue and forward the input message to a second system, system B, for processing. When processing is completed by system B, the response (outgoing message) is forwarded to system A and placed on system A's queue for transmission to the client. Thus, in this manner, multiple systems can be utilized to handle processing requests from numerous clients.

There are, however, a few disadvantages with this arrangement. For example, if system A fails, none of the work on the queue of system A can be accessed. Therefore, the client is forced to wait until system A is brought back online to have its transaction processed.

In order to address these disadvantages, a shared, or common, queue may be provided to store incoming messages for processing by any of a plurality of data processing systems. A common queue server receives and queues the messages onto the shared queue so that they can be retrieved by a system having available capacity to process the messages. In operation, a system having available capacity retrieves a queued message, performs the necessary processing, and places an appropriate response message back on the shared queue. Thus, the shared queue stores messages sent in either direction between clients requesting processing and the data processing systems that perform the processing.

Because the messages are enqueued onto the shared queue, the messages can be processed by an application running in any of a plurality of systems having access to the shared queue. Thus, automatic workload management among the plurality of systems is provided. Also, because any of the systems connected to the shared queue can process messages, an advantage of processing redundancy is provided. If a particular application that is processing a message fails, another application can retrieve that message from the shared queue and perform the processing without the client having to wait for the original application to be brought back on-line. This provides processing redundancy to clients of the data processing environment.

Implementing a shared queue introduces two unique problems, however. First, in case of an unexpected outage, the link to the shared queue or the storage associated with the shared queue may suffer an outage. Thus, while instances of the application that are generating and processing requests are still operable, the requests that have been placed onto the shared queue are not available. A second problem is that searching the shared queue for a particular request requires each instance of an application to search through all requests from all instances of the application.

SUMMARY OF THE INVENTION

An object of this invention is to improve data processing systems that use a shared queue to process messages.

Another object of the present invention is to maintain a mirror queue in the local storage of each instance of an application and to keep in that mirror queue a copy of each work request that was placed into a shared queue by that instance.

A further object of the invention is to provide a data processing system that uses a shared queue, with the ability to continue processing messages even in case of an outage of the shared queue or the storage associated with the queue.

These and other objectives are attained with a queue management system, and a method of managing a queue. This system and method are for use with a parallel processing system including a plurality of clients and a plurality of processors. The clients receive messages and transmit the messages to a shared queue for storage, and the processors retrieve messages from the shared queue and process said messages. The queue management system includes a mirror queue for maintaining a copy of each message transmitted to the shared queue by one of the clients; and means, running on said one of the clients, for storing to the mirror queue, a copy of each message transmitted to the shared queue by said one of the clients.

The mirror queue provides the system with continuity in case of an outage of the shared queue. In the event of such an outage, each instance of an application can simply discontinue using the shared queue and process requests from the mirror queue. The mirror queue is used until the shared queue is once again available.

Preferably, the copy of each message transmitted to the mirror queue is provided with a reference, such as a pointer, to the location of the message on the shared queue. When a processor receives a request for a particular message, the processor is able to search its mirror queue for the copy of the message. Also, if necessary, the processor, after finding the copy on the mirror queue, is able to use the reference in that copy to find the message on the shared queue.

Further benefits and advantages of the invention will become apparent from a consideration of the following detailed description, given with reference to the accompanying drawings which specify and show preferred embodiments of the invention.

DETAILED DESCRIPTION OF THE PREFERRED EMBODIMENTS

The present invention generally relates to systems and methods that may allow any of a plurality of processing systems to process messages for one or more clients. In the preferred embodiment, a structured external storage device, such as a shared queue, is provided for queuing client messages for the plurality of systems. When incoming messages are received from the clients, they are placed on the shared queue. When one of the plurality of systems has available processing capacity, it retrieves a message, processes the message and places a response on the queue.

Figure 1:
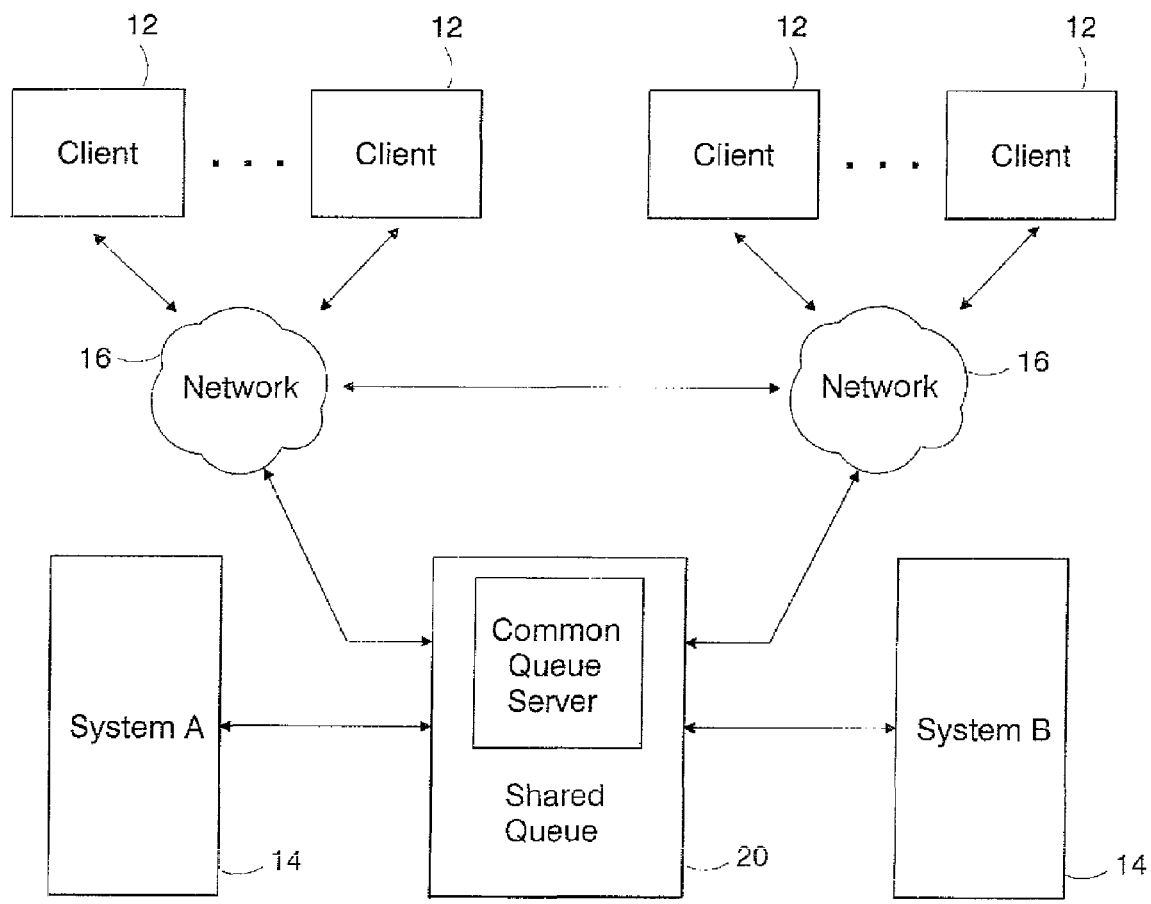
FIG. 1 is a block diagram showing a shared queue in a client/server environment.

FIG. 1 is a block diagram illustrating the shared queue in a client/server environment 10. The client/server environment includes one or more clients 12 interfaced to a plurality of processing systems 14 via one or more networks 16. When a client 12 has a transaction to be processed, the client enqueues the message onto shared queue 20. As additional messages are received from clients, they too are enqueued onto shared queue 20. Each message remains on the shared queue 20 until the message is retrieved by one of the systems 14 for processing.

When a system 14 determines that it has the capacity to process another transaction, that system 14 dequeues a message from shared queue 20. That system 14 then processes the message and places on shared queue 20 the appropriate response to the client that generated the incoming message. A common queue server 22 provides the necessary interface between shared queue 20 and systems 14. When an input message is received by common queue server 22 for enqueueing onto shared queue 20, the queue server buffers the message in one or more buffers and then transfers this data to the shared queue. Any suitable common queue and common queue server may be used in the practice of this invention.

As mentioned above, two problems may be encountered when implementing a shared queue. In particular, in case of an unexpected outage, the link to the shared queue or the associated storage may suffer an outage. Also, searching the shared queue for a particular request requires each instance of an application to search through all requests from all instances of the application.

To address these problems, this invention uses a feature referred to as a "Mirror Queue," which is a queue maintained in the local storage of each instance of an application and that contains a copy of each work request that was placed onto the shared queue by the instance. The Mirror Queue, described in detail below, provides several advantages. One advantage is that should the link to the shared queue or the storage associated with the shared queue suffer an outage, each instance of the application can immediately retrieve its outstanding work requests from its Mirror Queue without any losses. The application can process from the Mirror Queue until the outage is resolved. This guarantees that a request will be processed. Another advantage of using a mirror queue is that when needing access to a particular entry on the shared queue, an application can simply search through the requests on its Mirror Queue. Once the application finds the request it needs, it can easily find the corresponding request on the shared queue. Based on the number of instances sharing the common queue, this can greatly reduce the time that it takes to find a unique request. A third advantage is that the Mirror Queue can also serve as a work selection caching mechanism to obtain requests from the shared queue in anticipation of the request being selected by the instance.

Figure 2:
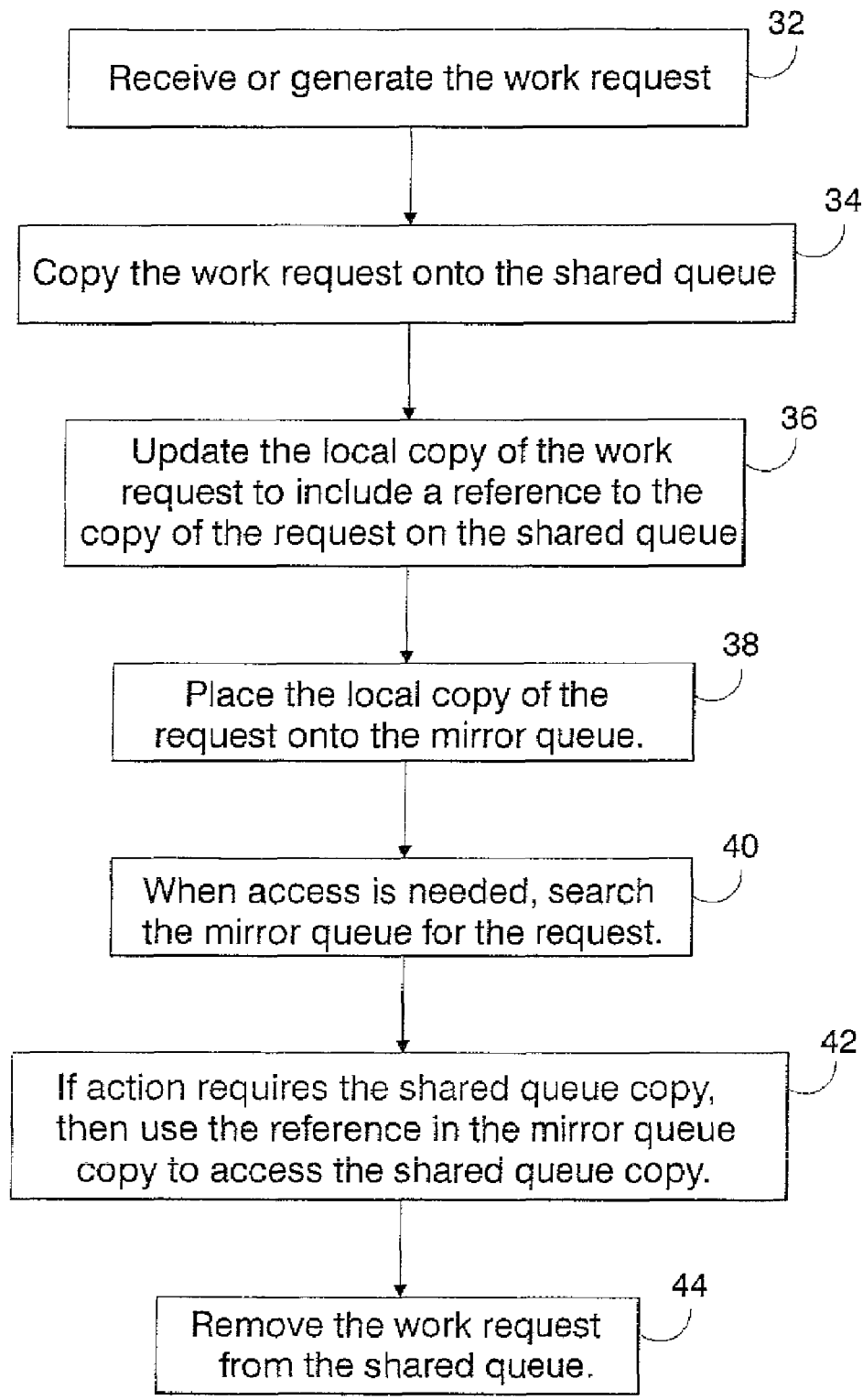
FIG. 2 illustrates a procedure for implementing and using a mirror queue in a shared queue environment.

Preferably, with reference to FIG. 2, when an instance of an application receives or generates a work request, as represented at step 32, the instance copies that request onto the shared queue at step 34. That instance, at step 36, then updates the local copy of the request with some type of immediate reference, such as a pointer, to the copy of the request on the shared queue. The immediate reference may be, or example, an entry id assigned to the request when it is put onto the shared queue. The local copy of the request is then, at step 40, placed onto the local Mirror Queue. After the request has been processed, the request is, at step 42, dequeued from the Mirror Queue.

If access to a particular request is needed (because, for instance, the request needs to be canceled, a user is requesting information about the request, etc), then instead of searching the entire shared queue, the application searches its Mirror Queue for the particular request, as represented at step 42. If the action being done against the request requires the shared queue copy, then, at step 44, the reference to the copy of the request on the shared queue is used to immediately access that copy. Accessing requests on the shared queue in this manner significantly reduces the number of requests that must be scanned, and avoids locking the entire shared queue during the search.

In the event of an outage of the shared queue, each instance of the application simply discontinues using the shared queue and processes requests from the Mirror Queue. The Mirror Queue is used until the shared queue is once again available. When the shared queue is available, outstanding requests are copied from the Mirror Queue to the shared queue and the shared queue is used once again. This technique makes outages of the shared queue transparent to the end user.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A queue management system for managing a queue in a parallel processing system including a plurality of client processors, a plurality of server processors, and a shared queue, each of the client processors including an associated mirror queue, and wherein the client processors generate messages and copy the messages onto the shared queue, and the server processors retrieve messages from the shared queue, process the retrieved messages to generate responses, and place said generated responses onto the shared queue, the queue management system comprising:

copy means on each of the client processors for copying onto the mirror queue associated with said each client processor the messages copied by said each of the client procesors onto the shared queue; and removing means on each of the client processors, for removing, after one of the messages that was copied into the shared queue by said each client processor is processed by one of the server processors, the copy of said one of the messages from the shared queue; and wherein, at specified times, each of the client processors discontinues use of the shared queue and processes messages on the mirror queue associated with said each client processor; and after said specified times, said each of the client processors resumes use of the shared queue, and copies onto the shared queue outstanding messages from the mirror queue associated with said each of the client processors; wherein:

each client processor maintains a local copy of each message generated by said each client processor; and after copying said one of the messages onto the shared queue, said each client processor updates said local copy of said one of the messages with a reference to the location of said one of the messages on the shared queue, and then copies said local copy of said one of the messages, including said reference onto the mirror queue.

2. A queue management system according to claim 1, wherein:
said specified times are when the shared queue is not available to the client processors; and
each client processor copies said outstanding messages onto the shared queue when the shared queue becomes available after having been not available for a period of time.

3. A queue management system according to claim 2, wherein said reference is a pointer to the location of said one of the message on the shared queue.

4. A queue management system according to claim 3, wherein:
when a user requests one of the client processors for access to a given one of the messages on the shared queue, said one of the client processors, in response to said request, searches through the mirror queue associated with said one of the client processors for a copy of said given one of the messages; and
if said copy of said given one of the messages is found in said associated mirror queue, said one of the client processors uses the pointer in said copy of said given messages to find the copy of the given message on the shared queue.

5. A method of managing a queue in a parallel processing system including a plurality of client processors, a plurality of server processors, and a shared queue, each of the client processors including an associated mirror queue, the method comprising the steps of:
the client processors generating messages, including the step of each client processor maintaining a local copy of each message generated by said each client processor;
the client processors copying the messages onto the shared queue, including the steps of, each client processor,
i) after copying one of the messages onto the shared queue, updating said local copy of said one of the messages with a reference to the location of said one of the messages on the shared queue, and ii) then copying said local copy of said one of the messages, including said reference, onto the mirror queue;
the server processors retrieving messages from the shared queue, processing said retrieved messages to generate responses, and placing said generated responses onto the shared queue;
each of the client processors, after one of the messages that was copied onto the shared queue by said each client processor is processed by one of the server processors, removing the copy of said one of the messages from the shared queue; and
at specified times, each of the client processors discontinuing use of the shared queue and processing messages on the mirror queue associated with said each client processor; and after said specified times, said each of the client processors resuming use of the shared queue, and copying onto the shared queue outstanding messages from the mirror queue associated with said each of the client processors.

6. A method according to claim 5 wherein:
said specified times are when the shared queue is not available to the client processors; and
the step of copying onto the shared queue outstanding messages includes the step of each client copying said messages onto the shared queue when the shared queue becomes available after having been not available for a period of time.

7. A method according to claim 5, wherein said reference is a pointer to the location of said one of the messages on the shared queue.

8. A method according to claim 7, wherein users request the client processors for access to the messages on the shared queue, and the method comprises the further steps of:
one of said client processors receiving a request from the user for access to a given one of the messages;
said one of the client processors, in response to receiving said request, searching through the mirror queue associated with said one of the client processors for a copy of the given one of the messages; and
when said copy of said given one of the messages is found in said associated mirror queue, said one of the client processors using the pointer in said copy of said given messages to find the copy of the given message on the shared queue.

9. A program storage device readable by computer, tangibly embodying a program of instructions executable by the computer to perform method steps for managing a queue in a parallel processing system including a plurality of client processors, a plurality of server processors, and a shared queue, each of the client processors including an associated mirror queue, the method steps comprising:
the client processors generating messages, including the step of each client processor maintaining a local copy of each message generated by said each client processor;
the client processors copying the messages onto the shared queue, including the steps of, each client processor,
i) after copying one of the messages onto the shared queue, updating said local copy of said one of the messages with a reference to the location of said one of the messages on the shared queue, and ii) then copying said local copy of said one of the messages, including said reference, onto the mirror queue;
the server processors retrieving messages from the shared queue, processing said retrieved messages to generate responses, and placing said generated responses onto the shared queue;
each of the client processors, after one of the messages that was copied onto the shared queue by said each client processor is processed by one of the server processors, removing the copy of said one of the messages from the shared queue; and
at specified times, each of the client processors discontinuing use of the shared queue and processing messages on the mirror queue associated with said each client processor; and after said specified times, said each of the client processors resuming use of the shared queue, and copying onto the shared queue outstanding messages from the mirror queue associated with said each of the client processors.

10. A program storage device according to claim 9, wherein:
said specified times are when the shared queue is not available to the client processors; and
the step of copying onto the shared queue outstanding messages includes the step of each client processor copying said outstanding messages onto the shared queue when the shared queue becomes available after having been not available for a period of time.

11. A program storage device according to claim 10, wherein said reference is a pointer to the location of said one of the messages on the shared queue.

12. A program storage device according to claim 11, wherein users request the client processors for access to messages on the shared queue, and the method steps comprise the further steps of:
- one of said client processors receiving a request from the user for access to a given one of the messages;
- said one of the client processors, in response to receiving said request, searching through the mirror queue associated with said one of the client processors for a copy of the given one of the messages; and
- if said copy of said given one of the messages is found in said associated mirror queue, said one of the client processors using the pointer in said copy of said given messages to find the copy of the given message on the shared queue.

13. A parallel processing system, comprising:
- a shared queue;
- a plurality of client processors for generating requests and copying said requests onto the shared queue, and wherein each of the client processors has an associated mirror queue;
- a plurality of server processors for retrieving messages from the shared queue, processing the retrieved messages to generate responses, and placing said generated responses onto the shared queue; and
- a queue management system comprising:
  - copying means on each of the client processors for copying onto the mirror queue associated with said each client processor the messages copied by said each of the client processors onto the shared queue; and
  - removing means on each of the client processors, for removing, after one of the messages that was copied into the shared queue by said each client processor is processed by one of the server processors, the copy of said one of the messages from the shared queue;
  - wherein, at specified times, each of the client processors discontinues use of the shared queue and processes messages on the mirror queue associated with said each client processor; and after said specified times, said each of the client processors resumes use of the shared queue, and copies onto the shared queue outstanding messages from the mirror queue associated with said each of the client processors;
- each client processor maintains a local copy of each message generated by said each client processor; and
- after copying said one of the messages onto the shared queue, said each client processor updates said local copy of said one of the messages with a reference to the location of said one of the messages on the shared queue, and then copies said local copy of said one of the messages, including said reference, onto the mirror queue.

14. A parallel processing system according to claim 13, wherein:
- said specified times are when the shared queue is not available to the client processors; and
- each client processor copies said outstanding messages onto the shared queue when the shared queue becomes available after having been not available for a period of time.

* * * * *